United States Patent
Mizukane (10) Patent No.: US 12,128,596 B2
(45) Date of Patent: Oct. 29, 2024

(54) MOLDING DEVICE

(71) Applicant: Konica Minolta, Inc., Tokyo (JP)

(72) Inventor: Takahiro Mizukane, Yokohama (JP)

(73) Assignee: Konica Minolta, Inc., Tokyo (JP)

( * ) Notice: Subject to any disclaimer, the term of this patent is extended or adjusted under 35 U.S.C. 154(b) by 1242 days.

(21) Appl. No.: 16/618,999

(22) PCT Filed: May 28, 2018

(86) PCT No.: PCT/JP2018/020279
§ 371 (c)(1),
(2) Date: Dec. 3, 2019

(87) PCT Pub. No.: WO2018/225550
PCT Pub. Date: Dec. 13, 2018

(65) Prior Publication Data
US 2021/0146584 A1    May 20, 2021

(30) Foreign Application Priority Data

Jun. 6, 2017 (JP) .................................. 2017-111391

(51) Int. Cl.
*B29C 45/00* (2006.01)
*B29C 33/00* (2006.01)
(Continued)

(52) U.S. Cl.
CPC ...... *B29C 45/2673* (2013.01); *B29C 45/7331* (2013.01); *B29K 2905/00* (2013.01)

(58) Field of Classification Search
CPC .. B29C 45/1756; B29C 45/2673; B29C 33/00
See application file for complete search history.

(56) References Cited

U.S. PATENT DOCUMENTS 7,963,760 B2 * 6/2011 Cho ..................... B29C 35/02
219/537
8,764,433 B2 * 7/2014 Kim ..................... B29C 45/73
425/552
(Continued)

FOREIGN PATENT DOCUMENTS

CN     101480827 A    7/2009
JP     H05-6539 A     1/1993
(Continued)

OTHER PUBLICATIONS

JP2009073114A ( Mitsuyoshi ) Sep. 2007 (online machine translation), [Retrieved on Mar. 23, 2022]. Retrieved from: Espacenet (Year: 2007).*

(Continued)

*Primary Examiner* — Seyed Masoud Malekzadeh
*Assistant Examiner* — Andres E. Behrens, Jr.
(74) *Attorney, Agent, or Firm* — LUCAS & MERCANTI, LLP (57) ABSTRACT

A molding device includes an insert mold and a base mold. The insert mold is attached to the base mold in a replaceable manner. The base mold includes a frame and a pipe. Inside the frame, the insert mold is inserted. Inside the pipe, a fluid for temperature adjustment flows. Between the insert mold and the base mold, an elastically deformable heat transfer member is arranged. The heat transfer member is in contact with both the insert mold and the base mold at least during molding.

10 Claims, 5 Drawing Sheets

(51) Int. Cl.
  *B29C 45/17* (2006.01)
  *B29C 45/26* (2006.01)
  *B29C 45/46* (2006.01)
  *B29C 45/73* (2006.01)

(56) References Cited

U.S. PATENT DOCUMENTS

| | | | | |
|---|---|---|---|---|
| 2006/0131474 A1* | 6/2006 | Katsuki | ............... | B29C 45/2632 |
| 2011/0069361 A1* | 3/2011 | Jun | ..................... | B29C 45/2642 359/2 |
| 2016/0279847 A1* | 9/2016 | Hoffmann | ............... | F16L 59/20 |

FOREIGN PATENT DOCUMENTS

| | | | | |
|---|---|---|---|---|
| JP | H06-285915 A | | 10/1994 | |
| JP | H09-314571 A | | 12/1997 | |
| JP | H10-119091 A | | 5/1998 | |
| JP | 2009073114 | * | 9/2007 | ........... B30B 15/064 |
| JP | 2009073114 A | * | 9/2007 | ............. B29C 43/10 |
| JP | 2013154625 A | | 8/2013 | |
| WO | 2004107335 A1 | | 12/2004 | |

OTHER PUBLICATIONS

JP2009073114 (Mitsuyoshi) Sep. 2007 (online machine translation), [Retrieved on Apr. 3, 2023]. Retrieved from: Espacenet (Year: 2007).*

"Young's Modulus." Wikipedia, Apr. 1, 2017, en.wikipedia.org/wiki/Young%27s_modulus. (Year: 2017).*

An, Taicheng, and Sean Li. "Temperature- and Thickness-dependent Elastic Moduli of Polymer Thin Films." Nanoscale Research Letters, vol. 6, No. 1, Springer Science+Business Media, Mar. 2011, https://doi.org/10.1186/1556-276x-6-243. (Year: 2011).*

PCT, International Preliminary Report on Patentability for the corresponding application No. PCT/JP2018/020279, dated Dec. 10, 2019, with English translation (13 pages).

PCT, International Search Report for the corresponding application No. PCT/JP2018/020279, dated Aug. 1, 2018 (4 pages).

CNIPA, Office Action/Search Report for the related CN Application No. 201880035636.6, dated Feb. 3, 2021, with English translation.

CNIPA, Office Action/Search Report for the related CN Application No. 201880035636.6, dated Jul. 5, 2021, with English translation.

* cited by examiner

MOLDING DEVICE

CROSS REFERENCE TO RELATED APPLICATION

This Application is a 371 of PCT/JP2018/020279 filed on May 28, 2018 which, in turn, claimed the priority of Japanese Patent Application No. 2017-111391 filed on Jun. 6, 2017, both applications are incorporated herein by reference.

TECHNICAL FIELD

The present invention relates to a molding device including a pipe(s) for temperature adjustment.

BACKGROUND ART

In a general injection molding device, melted resin is injected into a cavity of a mold, and after the resin solidifies, the molded product is removed from the mold to be taken out. As a recent trend, small-lot production of a wide variety of molded products has been increasing. In order to mold a wide variety of resin products, it is necessary to manufacture a mold for each of products having different shapes. However, manufacturing a mold for each product increases costs of products of small lots, and also takes much time. To solve these problems, there has been developed a cassette mold technology with which a part common to molds is assigned to a base mold, and a part unique to each product (cavity shape) is assigned to an insert mold that is replaceable. The cassette mold technology can reduce costs and time required for manufacturing a mold for each product. The cassette mold technology is considered to be especially effective for products of small lots because their mold depreciation expense accounts for a large portion of their component expenses.

Dimensions and shape of a molded product vary depending on a mold temperature during molding. Hence, it is necessary, in molding resin products, which especially require precision, to stabilize the mold temperature during molding. In general, the mold temperature is often adjusted by providing cooling channels (pipes) in a mold and flowing a temperature-adjusted fluid (water or oil) there. Because in a mold, the vicinity of a cavity, where a product(s) is formed, requires temperature adjustment most, it is common to provide pipes in an insert mold or in both an insert mold and a base mold. However, if a pipe(s) for temperature adjustment is provided in an insert mold, which forms a cavity, it is necessary to remove and reassemble the pipe every time the insert mold is detached from its base mold. This increases replacement time of insert molds and decreases production efficiency, especially in molding products of small lots.

To deal with such problems, Patent Literature 1 discloses a molding device using the cassette mold technology, wherein cooling channels are provided only on the base mold side. More specifically, temperature adjustment blocks made of a highly heat-conductive material are biased toward a base mold by biasing means, and the temperature adjustment blocks are provided with cooling channels as temperature adjustment means. An insert mold is mounted in a housing recess of the base mold, and sandwiched between and held by the temperature adjustment blocks in a state in which both side surfaces of the insert mold are in close contact with side surfaces of the temperature adjustment blocks. Temperature in the vicinity of a cavity of the insert mold is stabilized by heat transfer from the temperature adjustment blocks of the base mold. According to the technology disclosed in Patent Literature 1, the insert mold is provided with no temperature adjustment means. This eliminates troublesome work, such as pipe connecting at the time of replacement of insert molds, and is considered to lead to reduction of setup time.

CITATION LIST

Patent Literatures

Patent Literature 1: JPH 06-285915 A
Patent Literature 2: JPH 10-119091 A

SUMMARY OF INVENTION

Technical Problem

The technology disclosed in Patent Literature 1 is effective in an ideal state, but has problems to be solved in practice. That is, in order to bring the base mold and the insert mold into close contact with one another, their members having flat surfaces are appressed to one another, thereby forming the close contact state, but for various reasons as described below, there are some cases where the close contact state cannot be ensured during molding. If a base mold and an insert mold are not in close contact with one another, air, which has high heat-insulating properties, is interposed between them, and thermal conduction efficiency between the base mold and the insert mold greatly decreases. As a result, the effect of temperature adjustment with a pipe(s) provided in the base mold may not reach the insert mold, and the temperature in the vicinity of its cavity may not be adjusted accurately.

[Reasons why Base Mold and Insert Mold are not in Close Contact]

(1) In a case where a base mold and an insert mold are made of materials having different linear expansion coefficients, even if the base mold and the insert mold are in close contact with one another at room temperature, they may separate from one another or press against one another when the temperature changes during molding, and generate contortions with generated stress. This problem can be avoided by the base mold and the insert mold being made of materials having the same linear expansion coefficient, but this narrows degree of freedom in selecting mold materials.

(2) In a case where an insert mold is composed of a plurality of plates, if they have dimension errors, a step is generated in at least one connecting surface, and if a facing one is flat, a gap may be generated. This problem can be avoided by making the margin of error of the plates approximately zero, but this makes insert mold manufacturing costs enormous.

(3) Even in a case where a connecting surface(s) of an insert mold is a high-precision flat surface at room temperature, if the temperature of the insert mold during molding is not uniform, thermal expansion is not uniform either, which may contort the connecting surface and greatly reduce its flatness.

For these multiple reasons, it often happens that the close contact state between a base mold and an insert mold cannot be maintained during molding, which decreases temperature adjustability. In particular, an insert mold having a large size tends to make disagreement in thermal expansion with its base mold large, and the above problems tend to be actualized.

Patent Document 2 discloses a mold for molding resin including a cavity plate, a cavity insert mold, a core plate, and a core insert mold, wherein predetermined clearances are provided between the members, and elastic members may be provided in the clearances. However, the elastic members disclosed in Patent Literature 2 are not for adjusting the temperature of the insert molds but for improving positioning accuracy between the members.

The present invention has been conceived in view of the above circumstances, and objects of the present invention include providing a molding device that can effectively adjust, while using a base mold to which an insert mold is attached in a replaceable manner, the temperature of the insert mold without increasing mold manufacturing costs or time and effort in replacing the insert mold.

Solution to Problem

A molding device of the present invention is a molding device including:
an insert mold; and
a base mold to which the insert mold is attached in a replaceable manner, wherein
the base mold includes a pipe where a fluid for temperature adjustment flows, and
an elastically deformable heat transfer member that is in contact with both the insert mold and the base mold at least during molding is arranged between the insert mold and the base mold.

Advantageous Effects of Invention

According to the present invention, there is provided a molding device that can effectively adjust, while using a base mold to which an insert mold is attached in a replaceable manner, the temperature of the insert mold without increasing mold manufacturing costs or time and effort in replacing the insert mold.

DESCRIPTION OF EMBODIMENTS

Figure 1A:
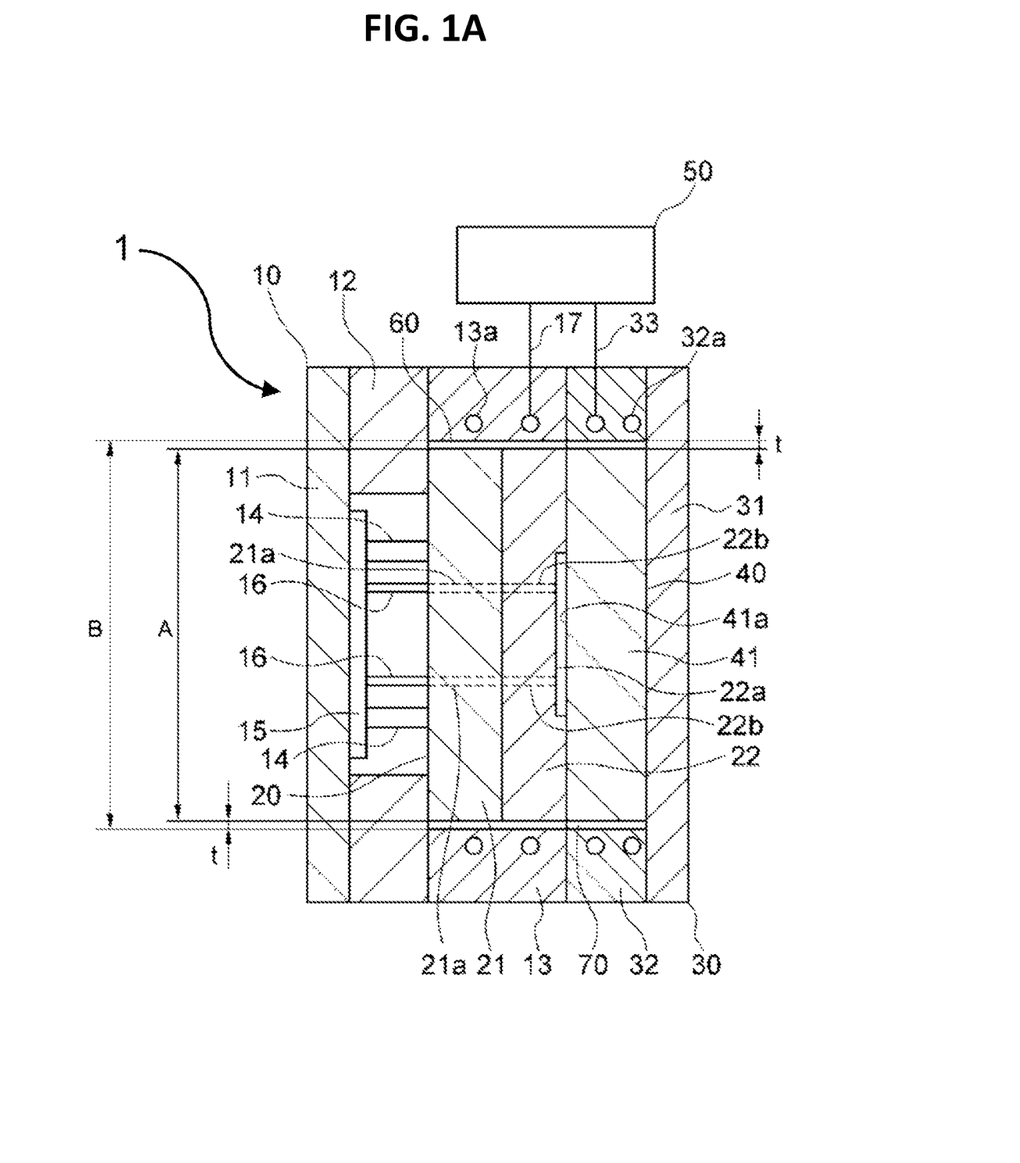
FIG. 1A is a schematic cross-sectional view of an injection molding device according to an embodiment(s).

Hereinafter, one or more embodiments of the present invention will be described with reference to the accompanying drawings. FIG. 1A is a schematic cross-sectional view of an injection molding device 1 according to an embodiment(s). The injection molding device 1 has a fixed-side base mold 10, a fixed-side insert mold 20, a movable-side base mold 30, a movable-side insert mold 40, a temperature adjustment unit 50, a fixed-side elastic member 60, and a movable-side elastic member 70. The fixed-side base mold 10 and the movable-side base mold 30 constitute a base mold, the fixed-side insert mold 20 and the movable-side insert mold 40 constitute an insert mold, and the fixed-side elastic member 60 and the movable-side elastic member 70 are elastically deformable heat transfer members.

The fixed-side base mold 10 made of steel has a fixed-side retainer plate 11, a first frame 12 attached to the fixed-side retainer plate 11, and a second frame 13 attached to the first frame 12. Inside the first frame 12, a pair of guide shafts 14 is implanted in the fixed-side retainer plate 11, and a slider plate 15 is arranged so as to be movable along the guide shafts 14. In the slider plate 15, ejector pins 16 are implanted. In the second frame 13, a pipe 13a extending in the circumferential direction is spirally formed, and both ends thereof are connected to the temperature adjustment unit 50, which is provided outside, via a connecting pipe 17.

The fixed-side insert mold 20 has a first block 21 and a second block 22 that are inserted inside the second frame 13 of the fixed-side base mold 10. On the movable-side surface of the second block 22, a molding surface 22a is formed. In the first block 21 and the second block 22, through holes 21a and through holes 22b through which the ejector pins 16 are inserted are formed. The through holes 22b are open on the molding surface 22a.

Between (i) the second frame 13 of the fixed-side base mold 10 and (ii) the first block 21 and the second block 22 of the fixed-side insert mold 20, a space having a thickness t is formed on the entire circumference, and in the space, the fixed-side elastic member 60 is arranged so as to be in close contact with the inner circumferential surface of the second frame 13 and the outer circumferential surface(s) of the first block 21 and the second block 22.

The movable-side base mold 30 made of steel has a movable-side retainer plate 31 and a third frame 32 attached to the movable-side retainer plate 31. In the third frame 32, a pipe 32a extending in the circumferential direction is spirally formed, and both ends thereof are connected to the temperature adjustment unit 50, which is provided outside, via a connecting pipe 33.

The movable-side insert mold 40 has a third block 41 that is inserted inside the third frame 32 of the movable-side base mold 30. On the fixed-side surface of the third block 41, a molding surface 41a is formed. It is preferable that the fixed-side insert mold 20 and the movable-side insert mold 40 be each formed of one of an aluminum alloy, a beryllium copper alloy, a zinc alloy, and an aluminum-ceramic composite because these materials have a thermal conductivity of 100 W/m·K or more and satisfy strength required as molds for injection molding. The thermal conductivity of 100 W/m·K or more improves efficiency of heat transfer from contact surfaces of insert molds to molding surfaces of the insert molds and quickly stabilizes the mold temperature, and hence is effective even for large insert molds.

Between (i) the third frame 32 of the movable-side base mold 30 and (ii) the third block 41 of the movable-side insert mold 40, a space having a thickness t is formed on the entire circumference, and in the space, the movable-side elastic member 70 is arranged so as to be in close contact with the inner circumferential surface of the third frame 32 and the outer circumferential surface of the third block 41.

Figure 1B:
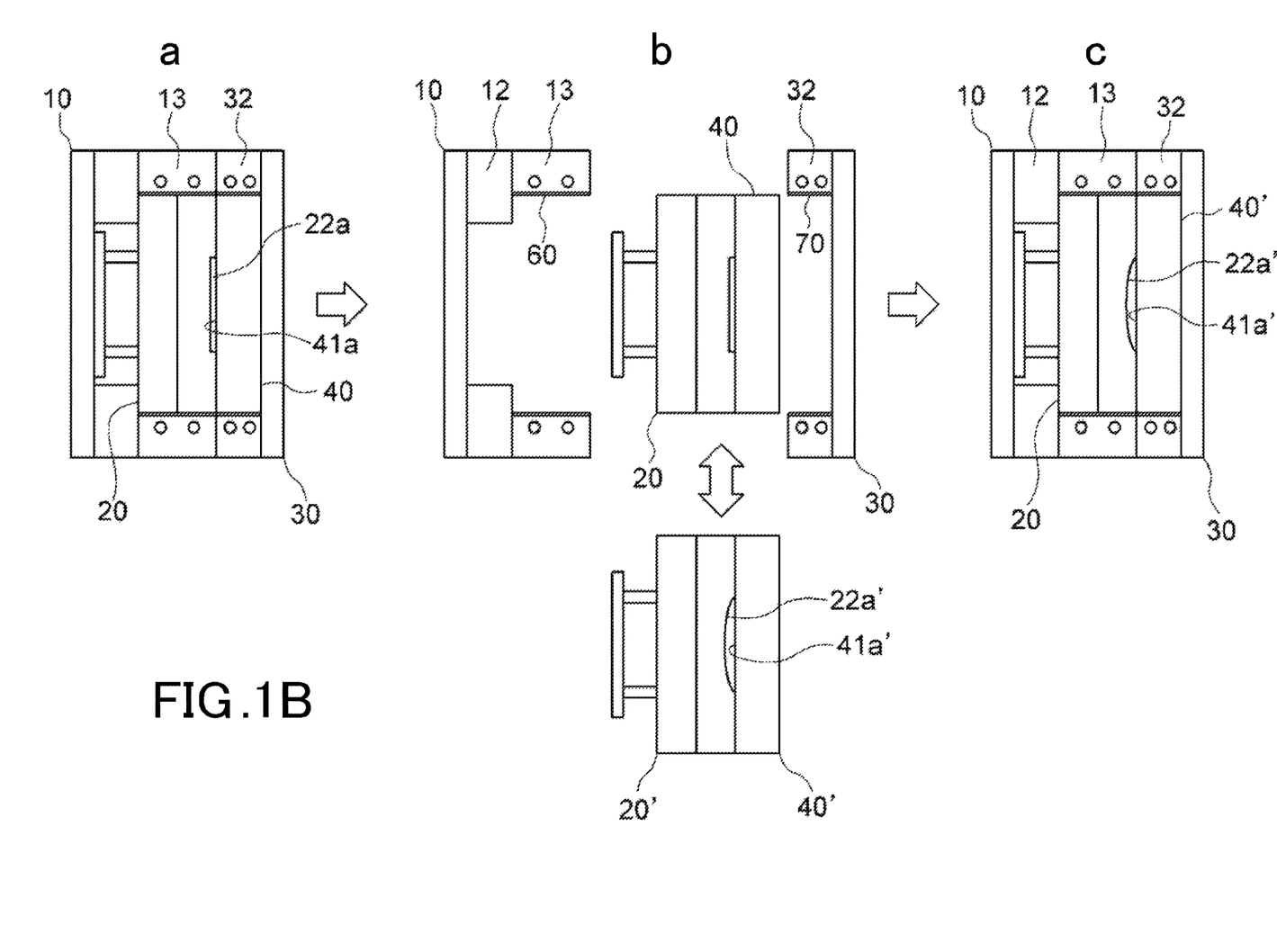
FIG. 1B shows steps of replacing an insert mold of the molding device, wherein hatching on the cross section is omitted.

As shown in FIG. 1B, in this embodiment, the fixed-side insert mold 20 and the movable-side insert mold 40 can be replaced with other fixed-side insert mold 20' and movable-side insert mold 40'. The fixed-side insert mold 20' has a molding surface 22a' having a shape different from that of the molding surface 22a, and the movable-side insert mold 40' has a molding surface 41a' having a shape different from that of the molding surface 41a. Replacement work thereof will be described specifically. From the assembled state shown in (a), the movable-side base mold 30 having the third frame 32 and the movable-side elastic member 70 is detached as one body, and also the fixed-side insert mold 20 and the movable-side insert mold 40 are detached as one body from the fixed-side base mold 10, like the dissembled state shown in (b). After they are replaced with the fixed-side insert mold 20' and the movable-side insert mold 40', the fixed-side insert mold 20' and the movable-side insert mold 40' are combined with the fixed-side base mold 10, and lastly the movable-side base mold 30 having the third frame 32 and the movable-side elastic member 70 is attached thereto, like the reassembled state shown in (c). The outer dimensions of the pre-replacement fixed-side insert mold 20 and the post-replacement fixed-side insert mold 20' are equal, and also the outer dimensions of the pre-replacement movable-side insert mold 40 and the post-replacement movable-side insert mold 40' are equal. Hence, it is possible for the molding device of this embodiment to replace the insert mold only and consequently handle small-lot production of a wide variety of resin molded products while suppressing mold costs. Further, because no pipe for temperature adjustment is provided in either the fixed-side insert mold 20 or the movable-side insert mold 40, they can be replaced with others quickly.

The fixed-side elastic member 60 and the movable-side elastic member 70 are preferably rubber-like sheets or films, particularly preferably heat-conductive sheets made of silicone, because they are easily processed and brought into surface contact with others. The fixed-side elastic member 60 and the movable-side elastic member 70 preferably have a thickness of between 0.1 mm and 5 mm both inclusive, a thermal conductivity of 2 W/m·K or more, and an elastic modulus of 1 GPa or less. If the fixed-side elastic member 60 and the movable-side elastic member 70 have a thickness of more than 5 mm, which is too thick, or have a thermal conductivity of less than 2 W/m·K, which is too low, they may inhibit heat transfer between the base mold and the insert mold by their own heat insulation. On the other hand, if the fixed-side elastic member 60 and the movable-side elastic member 70 have an elastic modulus of more than 1 GPa, which is too high, or have a thickness of less than 0.1 mm, which is too thin, they may be unable to absorb disagreement (gap) between contact surfaces. The above specifications of the elastic members can absorb the disagreement between the contact surfaces while minimizing influence of the inhibition of the heat transfer.

Figure 2:
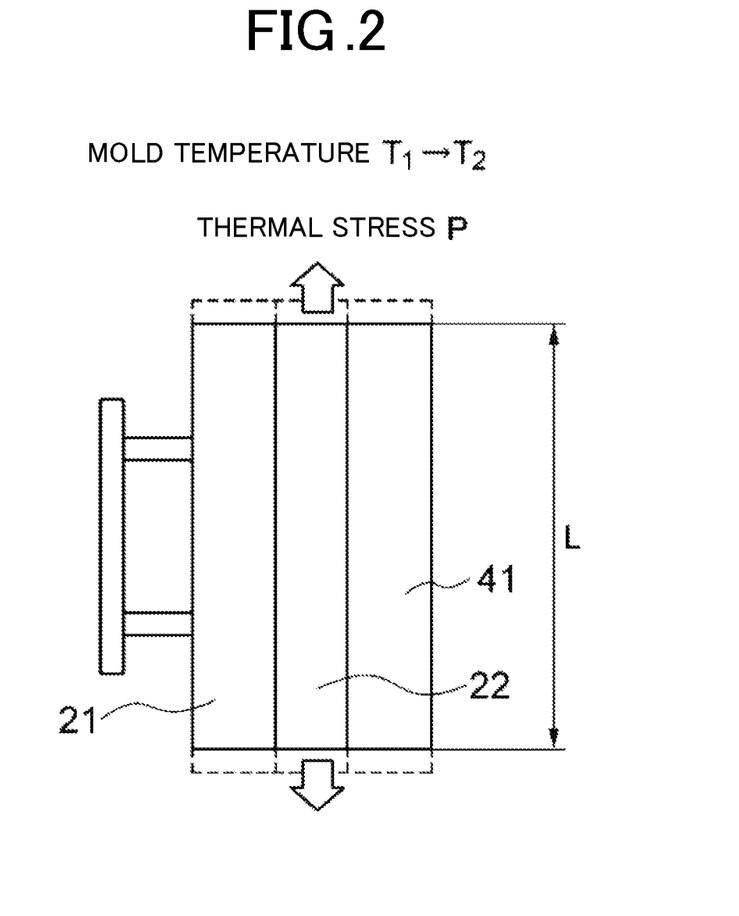
FIG. 2 exaggeratedly shows, with broken lines, thermal expansion of a fixed-side insert mold 20 and a movable-side insert mold 40 caused when their temperature increases from room temperature to a molding temperature.

FIG. 2 exaggeratedly shows, with broken lines, thermal expansion of the fixed-side insert mold 20 and the movable-side insert mold 40 caused when their temperature increases from room temperature to a molding temperature. In this embodiment, the first block 21, the second block 22, and the third block 41, which constitute the insert mold, are made of the same material, and also the fixed-side elastic member 60 and the movable-side elastic member 70 are made of the same material. It should be noted that a represents a linear expansion coefficient (/K) of the material of the insert mold, Em represents Young's modulus (GPa) of the material of the insert mold, E represents Young's modulus (elastic modulus) (GPa) of the material of the elastic members, L represents a dimension (mm) of the insert mold in the thickness direction of the elastic members, and t represents a thickness (mm) of the elastic members. The thickness direction of the elastic members refers to the heat transfer direction.

When the temperature of the insert mold is increased from T1 to T2, thermal stress P generated in the insert mold is expressed as follows:

$$P = Em \times (\delta/L), \text{ where } \delta = a \times (T2-T1) \times L/2.$$

If force F required to deform the elastic members is less than the thermal stress P of the insert mold (F<P), the elastic members can absorb the thermal expansion of the insert mold. From this condition, the following formula holds:

$$E \times (\delta/t) < Em \times (\delta/L), \text{ and hence}$$

$$t > E/Em \times L \qquad (1).$$

Figure 3A:
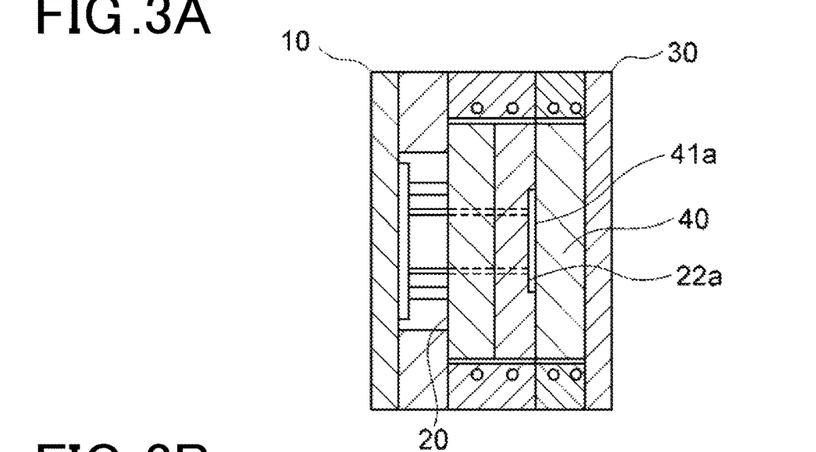
FIG. 3A shows a step of molding performed by the molding device.
Figure 3B:
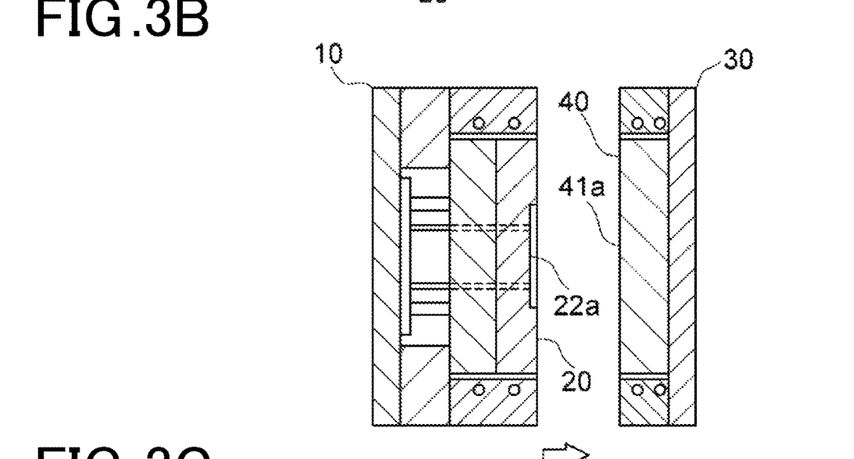
FIG. 3B shows a step of molding performed by the molding device.
Figure 3C:
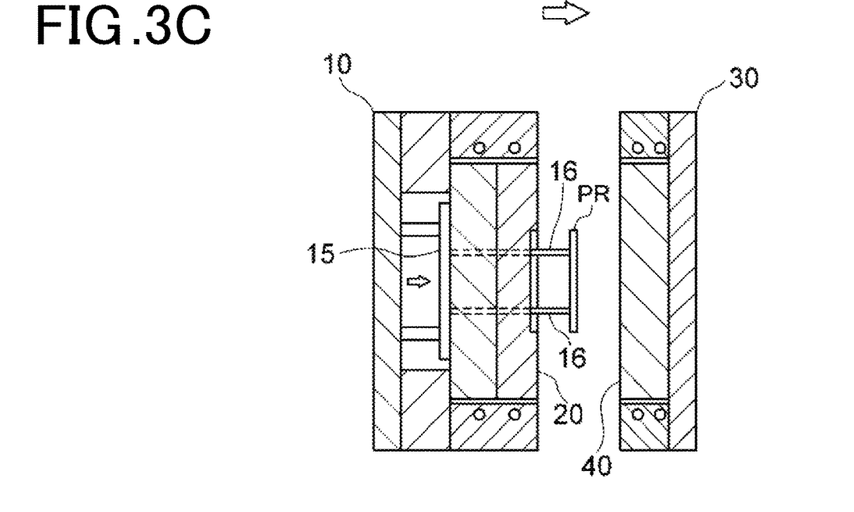
FIG. 3C shows a step of molding performed by the molding device.

Next, operation of the molding device according to this embodiment will be described. FIG. 3A to FIG. 3C show steps of molding performed by the molding device, wherein the temperature adjustment unit is omitted. From the temperature adjustment unit 50 shown in FIG. 1A, a temperature-adjusted fluid is supplied via the connecting pipes 17, 33 and then via the pipe 13a of the second frame 13 and the pipe 32a of the third frame 32 so that the fixed-side base mold 10 and the movable-side base mold 30 are adjusted to have a predetermined temperature. At this time, heat is conducted from the fixed-side base mold 10 to the fixed-side insert mold 20, which are in surface contact with one another, via the fixed-side elastic member 60, and also conducted from the movable-side base mold 30 to the movable-side insert mold 40, which are in surface contact with one another, via the movable-side elastic member 70. This can adjust the temperature(s) of the fixed-side insert mold 20 and the movable-side insert mold 40 to a temperature in a predetermined range.

In this state, as shown in FIG. 3A, the movable-side base mold 30 and the movable-side insert mold 40 are moved relative to the fixed-side base mold 10 and the fixed-side insert mold 20 so as to be clamped together, and melted resin is injected via a gate (not shown) into a cavity formed by the molding surface 22a on the fixed side and the molding surface 41a on the movable side. At this time too, heat is conducted from the fixed-side base mold 10 to the fixed-side insert mold 20, which are in surface contact with one another, via the fixed-side elastic member 60, and also conducted from the movable-side base mold 30 to the movable-side insert mold 40, which are in surface contact with one another, via the movable-side elastic member 70.

After the resin in the cavity solidifies, as shown in FIG. 3B, the movable-side base mold 30 and the movable-side insert mold 40 are separated from the fixed-side base mold 10 and the fixed-side insert mold 20, and as shown in FIG. 3C, the slider plate 15 is displaced, thereby pushing the tips of the ejector pins 16 toward the movable side. This can remove a resin molded product PR from the molding surface 22a.

In an example that was produced by the present inventor (with specifications below), dimensions before and after temperature change were as follows. Dimensions A, B and t correspond to those shown in FIG. 1A.

(a) Material of Insert Mold: aluminum alloy A7075 (linear expansion coefficient of $23.6 \times 10^{-6}$/K, thermal conductivity of 130 W/m·K)

Outer Dimension A of Insert Mold: 600 mm (measured at 25° C.)

Outer Dimension A of Insert Mold: 600.8 mm (measured at 80° C.)

(b) Material of Base Mold: steel S55C (linear expansion coefficient of 11.7×10⁻⁶/K, thermal conductivity of 46 W/m·K)

Inner Dimension B of Base Mold: 603 mm (measured at 25° C.)

Inner Dimension B of Base Mold: 603.4 mm (measured at 80° C.)

(c) Material of Elastic Member silicone rubber heat-conductive sheet (linear expansion coefficient of 2×10⁻⁴/K, thermal conductivity of 5 W/m·K)

Thickness t of Elastic Member: 3 mm (measured at 25° C.)

Thickness t of Elastic Member: 2.8 mm (measured after thermal expansion of base mold and insert mold at 80° C.)

According to the above example, due to the difference in thermal expansion between the base mold and the insert mold, the distance between the base mold and the insert mold was shortened 0.2 mm. However, the elastic member(s) absorbed this change. Thus, an insert mold can be in close contact with a base mold without being squeezed in the base mold, and hence they can exchange heat efficiently.

Figure 4:
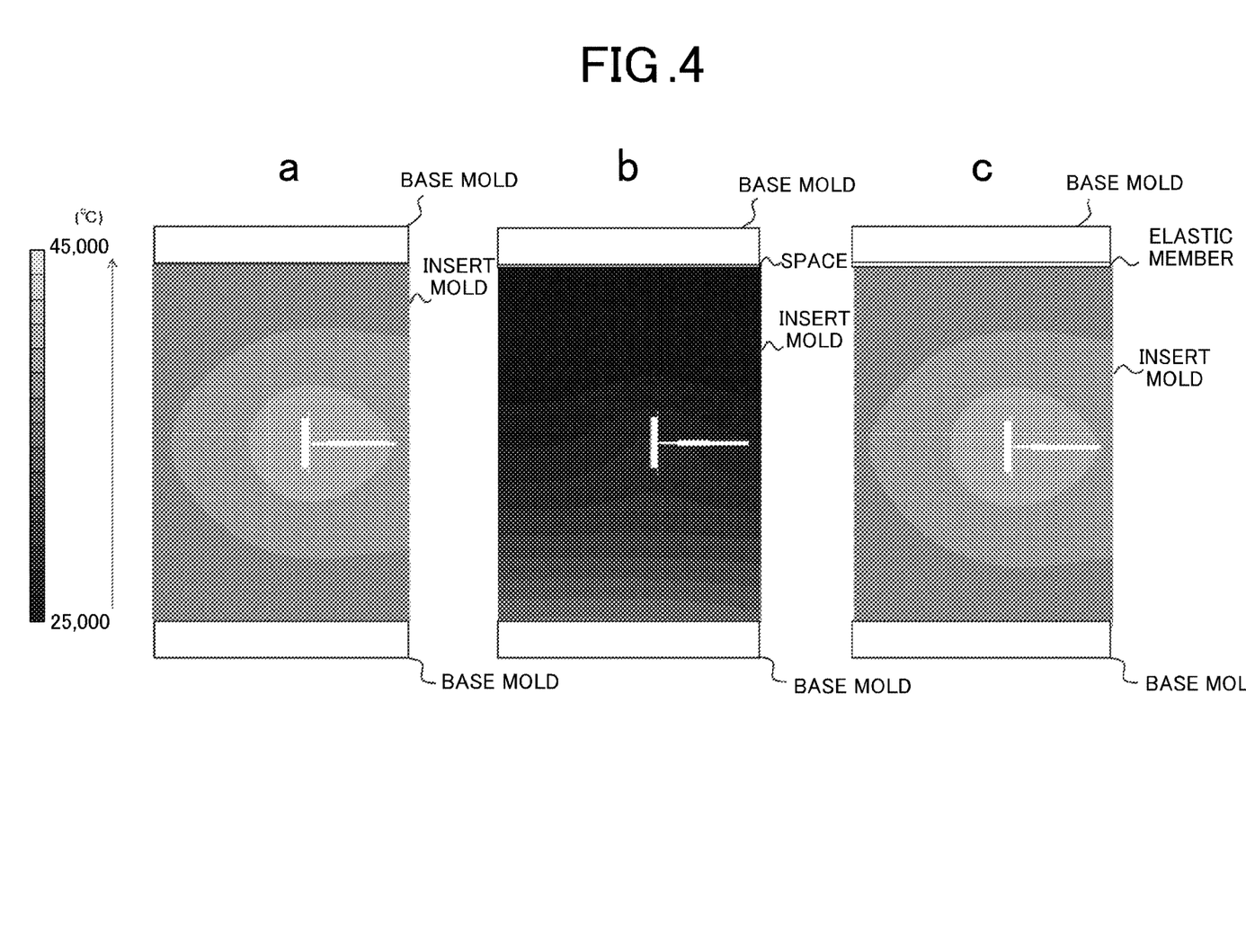
FIG. 4 shows simulation results of temperature distribution in a cross section of an insert mold.

Hereinafter, a simulation that was performed by the present inventor will be described. As shown in FIG. 4, the present inventor obtained temperature distribution in a cross section of an insert mold with a base mold arranged so as to be at both sides of the insert mold, in each of: a case (a) where both sides of the insert mold were in contact with the base mold; a case (b) where one side (lower side in FIG. 4) of the insert mold was is contact with the base mold, but between the other side (upper side in FIG. 4) of the insert mold and the base mold, a space of 1 mm was provided; and a case (c) where one side of the insert mold was in contact with the base mold, and an elastic member having a thickness of 3 mm was provided between the other side of the insert mold and the base mold so that they were in contact with one another. In this simulation, it was assumed that the air layer had a thermal conductivity of 0.02 W/m·K, the elastic member had a thermal conductivity of 10 W/m·K, and the temperature of the entire base mold was adjusted to 40° C. A white portion at the center of the insert mold indicates a cavity and a gate.

First, in the ideal contact state as shown in (a) of FIG. 4, the temperature distribution was well-balanced. On the other hand, as shown in (b) of FIG. 4, in the case where a space was provided between the insert mold and the base mold, heat was not sufficiently transferred from the base mold to the insert mold on the side where the space was provided between the insert mold and the base mold, and with respect to the other side where the insert mold was in close contact with the base mold, a temperature gradient was large. This may disable high-precision molding. Meanwhile, as shown in (c) of FIG. 4, it was found that providing an elastic member between the insert mold and the base mold enabled efficient heat transfer via the elastic member, and made the temperature distribution close to that in the ideal contact state shown in (a) of FIG. 4.

In the embodiment described above, the fixed-side elastic member 60 is arranged between the fixed-side base mold 10 and the fixed-side insert mold 20, and the movable-side elastic member 70 is arranged between the movable-side base mold 30 and the movable-side insert mold 40. However, an elastic member may be provided only on the movable side or the fixed side.

INDUSTRIAL APPLICABILITY

The present invention is suitable for providing a molding device including a pipe(s) for temperature adjustment.

REFERENCE SIGNS LIST

10 Fixed-side Base Mold
11 Fixed-side Retainer Plate
12 First Frame
13 Second Frame
13a Pipe
14 Guide Shaft
15 Slider Plate
16 Ejector Pin
17 Connecting Pipe
20 Fixed-side Insert Mold
21 First Block
21a Through Hole
22 Second Block
22a Molding Surface
22b Through Hole
30 Movable-side Base Mold
31 Movable-side Retainer Plate
32 Third Frame
32a Pipe
33 Connecting Pipe
40 Movable-side Insert Mold
41 Third Block
41a Molding Surface
50 Temperature Adjustment Unit
60 Fixed-side Elastic Member
70 Movable-side elastic Member

The invention claimed is:

1. A molding device comprising:
an insert mold; and
a base mold to which the insert mold is attached in a replaceable manner, wherein
the base mold includes: a frame where the insert mold is inserted; and a pipe where a fluid for temperature adjustment flows,
an elastically deformable heat transfer member that is in contact with both the insert mold and the base mold at least during molding is arranged between the insert mold and the base mold,
the elastically deformable heat transfer member is a sheet or a film made of rubber or resin,
the elastically deformable heat transfer member is disposed between the insert mold and the pipe in the base mold, and
the insert mold has a bottom surface and a side surface; the bottom surface is perpendicular to a direction of inserting the insert mold into the base mold; the frame includes a side frame and a retainer plate; the side frame is adjacent to the side surface of the insert mold; and the side frame includes the pipe.

2. The molding device according to claim 1, wherein the elastically deformable heat transfer member is in surface contact with both the frame and the insert mold.

3. The molding device according claim 1, wherein a formula below is satisfied:

$$t > E/E_m \times L \qquad (1)$$

wherein
t represents a thickness (mm) of the elastically deformable heat transfer member, E represents an elastic modulus (GPa) of the elastically deformable heat transfer member, Em represents an elastic modulus (GPa) of the insert mold, and L represents a dimension (mm) of the insert mold in a direction of the thickness of the elastically deformable heat transfer member.

4. The molding device according to claim 1, wherein the elastically deformable heat transfer member has a thickness of between 0.1 mm and 5 mm both inclusive, a thermal conductivity of 2 W/m·K or more at room temperature, and an elastic modulus of 1 GPa or less.

5. The molding device according to claim 1, wherein the insert mold has a thermal conductivity of 100 W/m·K or more.

6. The molding device according to claim 1, wherein the insert mold is made of any one of an aluminum alloy, a beryllium copper alloy, a zinc alloy, and an aluminum-ceramic composite.

7. The molding device according to claim 1, wherein the molding device is an injection molding device.

8. A molded product manufacturing method using the molding device according to claim 1, comprising:

attaching the insert mold to the base mold and performing mold clamping; and injecting molten resin into a cavity formed by the mold clamping.

9. The molding device according to claim 1, wherein the elastically deformable heat transfer member is located apart from the pipe.

10. The molding device according to claim 2, wherein the elastically deformable heat transfer member is disposed between the insert mold and the frame.

* * * * *